Patented Feb. 5, 1935

1,990,383

UNITED STATES PATENT OFFICE 1,990,383

CLEANING SOLUTION

Howard W. Kent, Concord, and Elbridge H. Gerry and Alexander M. Currier, Lynnfield, Mass., assignors to Sealbrick, Inc., Lynnfield Center, Mass., a corporation of Massachusetts No Drawing. Application December 22, 1930, Serial No. 504,214

2 Claims. (Cl. 87—5)

This invention relates to a composition of matter for use in cleaning the surfaces of buildings constructed of stone, brick or like materials.

Stone and brick structures are cleaned on their outer surfaces by the use of some cleansing agent such, for example, as hydrochloric acid. Cleansing agents which depend on a chemical action to remove foreign substances from the surface of stone-like materials often destroy the natural texture and color of the material. The comparatively strong concentration of the acid will often discolor certain types of natural stone as well as bricks of certain colors.

A building or some other type of structure constructed either entirely or partly from stone or brick even if successfully cleansed with an acid is not freed from the possibility of being later rendered unsightly by efflorescence which is caused by the salts present in the bricks coming to the surface. While certain preparations have been used to prevent the occurrence of efflorescence, they have not been entirely successful for the reason that the preparation formerly had to be applied after the cleaning operation which involved an additional operation with its attendant increased expense. It is also desirable to waterproof the exposed surface of the stone or brick and sometimes this has been effected at the same time that the building material has been treated to prevent efflorescence.

An object of this invention is to provide a novel composition of matter which will effectively clean, waterproof and prevent, to a large extent, the occurrence of efflorescence on buildings or other structures constructed of brick, stone and other like substances.

This object is attained by combining with soaptree bark extract an emulsion of rosin oil, raw linseed oil and a gum such as tragacanth and to the resulting composition is added hydrochloric acid.

While the ingredients have been combined in different proportions, one commercial form of the composition which has given satisfaction is compounded in the following proportions:

Soap tree bark _____ 9 lbs. 6 oz.
Rosin oil _____ 1¼ gals.
Raw linseed oil _____ 1¼ gals.
Gum tragacanth _____ 1¼ gals.
Hydrochloric acid—22% commercial ____ 10 gals.
Water enough to make up 100 gals.

Gum karaya and gum arabic are each to be considered the equivalent to gum tragacanth.

The proportions above given have been varied but it has been found that too large a proportion of an organic emulsifying agent such as gum tragacanth increases the tackiness of the composition to such an extent that it becomes difficult to handle and also the gum tends to deposit on the building material. This deposit is not readily removed by the rinsing operation. A smaller proportion of gums does not give a strong enough emulsifying action. The proportions suggested in the above table may be varied within reasonable limits and can still be relied upon to give satisfactory results.

In preparing the composition one suggested method is to steep the soap tree bark which is preferably from the genus quillaja saponaria in 40 gals. of water for about 12 hours or by forming an extract with water by any other well known method. The solution of gum tragacanth is prepared by dissolving 1 ounce of the gum in 1 gallon of water. As much gum tragacanth solution may be prepared as necessary. One and one quarter gallons of raw linseed oil and one and one quarter gallons of rosin oil are added to one and one quarter gallons of the gum tragacanth solution prepared as above suggested. The three substances are thoroughly mixed until an emulsion is obtained. The soap tree bark extract is then added and mixed until there is an emulsion of the soap tree bark, rosin oil, raw linseed oil and gum tragacanth contained in the water present. The hydrochloric acid is then slowly added and mixed until ten gallons of 22% commercial acid has been added.

The above emulsion forms a stock mixture which is reduced to one half of its original strength by the addition of an equal amount of water.

One method of using the mixture is to apply the emulsion to the surface to be cleaned by dipping a stiff bristle brush in a container containing the emulsion and scrubbing the brick or other material with the wet brush. The lime dirt and other foreign material will be loosened and may be removed by flushing the scrubbed surface with water. This rinsing operation may be repeated as often as may be necessary. The method of applying the emulsion may be varied as necessary and is to be considered as illustrative only.

When the brick or other stone-like material has been treated by the use of our composition, it is cleaned much more thoroughly than has been possible with the other known compositions. Not only is the material cleaned but the natural color of the material is restored on old as well as new materials. As indicated above the material is also waterproofed and treated to prevent efflorescence in the cleaning operation.

The function of the soap tree bark extract is substantially that of a weak alkali. In other words, the extract in the mixture makes emulsification easier and more permanent in nature.

The rosin oil and the raw linseed oil enter into the pores of the stone-like material and, when dried there by the oxidation which naturally follows the evaporation of the water and any unreacted residue of acid, prevent the salts which cause efflorescence from coming to the surface. Since these oils are water repellant, the treated material is made substantially waterproof. It is evident that our composition is effective in that a number of important results are obtained from one operation.

The action appears to be that the hydrochloric acid, and the soap-tree bark in so far as it has detergent effects, execute their attack upon the surface dirt which is to be removed, in the presence, and under the protection, of the colloidal covering and incipient film of the drying oils and gum, these elements being all in an emulsion together. The linseed oil ingredient of the emulsion has an instantaneous penetrative characteristic which helps carry into the pores of the brick the other oil and gum ingredients of the emulsion, these being substances which naturally are viscous and which dry with more body. Evaporation begins immediately, of the water and of any unreacted hydrochloric acid. This leaves the oil and gum to dry by oxidation within the microscopic pores of the brick, whose mouth portions they seal,—not having been removed by the superficial scrubbing. But all of the emulsion and loosened dirt on the actual surface of the brick having been washed away, by the scrubbing and flushing with water which is done before the film of drying oils becomes firm on the surface, the visible parts of the surface of the brick are left bare, displaying a restoration of natural color.

The result is observed that the composition accomplishes its cleaning without that characteristic "burning" of brick and of mortar joints which is well known ordinarily to attend the applying of hydrochloric acid of strong concentration. This finds expression in the said restoration of color, and may be in part because ordinarily the "burning" is really a bleaching of certain impurities in the brick, by chemical action of the chlorine and of oxygen from the air, but when our composition is used a quick incipient forming of the film excludes that oxygen; and it may be in part because of reactions due to the intimate presence of other materials in the composition; or it may be from some other cause; but, however caused, this effect of restoring the natural color is notable, even when the composition is used with strong acid, by way of contrast to the result when brick is cleaned with too strong hydrochloric acid alone. It is similarly a result that the white trim of buildings, such as limestone or caststone, is not discolored by the composition in the manner which is so objectionable when hydrochloric acid becomes spattered upon it in the ordinary cleaning of brick. Indeed the white stone trim and mortar in joints in brick may be cleaned by the composition without being stained or roughened as may result from hydrochloric acid, even though the proportion of hydrochloric acid in the composition is considerably greater than that above specified. The retardation of efflorescence in the brick is evidently due to the firm filling of the pores thereof by the drying oils and gums of the composition. This filling of the pores also delays the lodgement of fresh dirt.

While the composition is of great utility in cleaning new buildings, it is also used to good advantage for the cleaning of old buildings and for new buildings constructed of second hand stone-like materials. The color of old materials and of materials, such as bricks which have been discolored during the burning operation, is brought out and the appearance of the treated material is thereby improved.

It is evident that the proportions of the composition suggested above may be varied and that the method of applying the composition need not be the one described above since other methods may be used. It will be understood that the desirability of varying the proportions of the composition arises from the well known great differences in the character of dirt to be removed, and in the porosity and other differences in the materials for whose cleaning the composition may be applied. These latter are manifest, for example, between sand-struck brick and water-struck brick; and between limestone, cast-stone, concrete, ordinary mortar, and other masonry. Where the porosity is greater a larger proportion of heavy oil and gum filler is preferred; where the cleaning is more difficult, more acid should be used. It is also to be understood that the invention may be used on other materials than stone, brick and the like if desired.

Having thus described our invention, what we claim is:

1. A composition for use in cleaning the surface of building materials, consisting of forty gallons of soap tree bark extract formed by steeping nine pounds six ounces of soap tree bark in water, one and one quarter gallons of rosin oil, one and one quarter gallons of raw linseed oil, one and one quarter gallons of gum tragacanth solution made by dissolving one and one quarter ounces of gum tragacanth in one and one quarter gallons of water, and ten gallons of 22% commercial hydrochloric acid.

2. A composition of matter for use in cleaning the surfaces of stone-like materials, comprising water, commercial hydrochloric acid, a water soluble saponaceous material, a drying fatty oil, and a water soluble gum as emulsifying agent,—the approximate proportions, for the cleaning of walls having brick with mortar joints of moderate porosity and moderate difficulty of cleaning, being about one-fifth acid; one-tenth each of the oils and gum solution, and the remainder water with a small amount of a water soluble saponaceous material.

HOWARD W. KENT.
ELBRIDGE H. GERRY.
ALEXANDER M. CURRIER.